March 1, 1966  E. H. HAUGEN ETAL  3,237,387
FILTER ASSEMBLY
Filed April 20, 1960  2 Sheets-Sheet 1

INVENTORS
MILTON A. POWERS
EDMOND H. HAUGEN
BY
ATTORNEYS

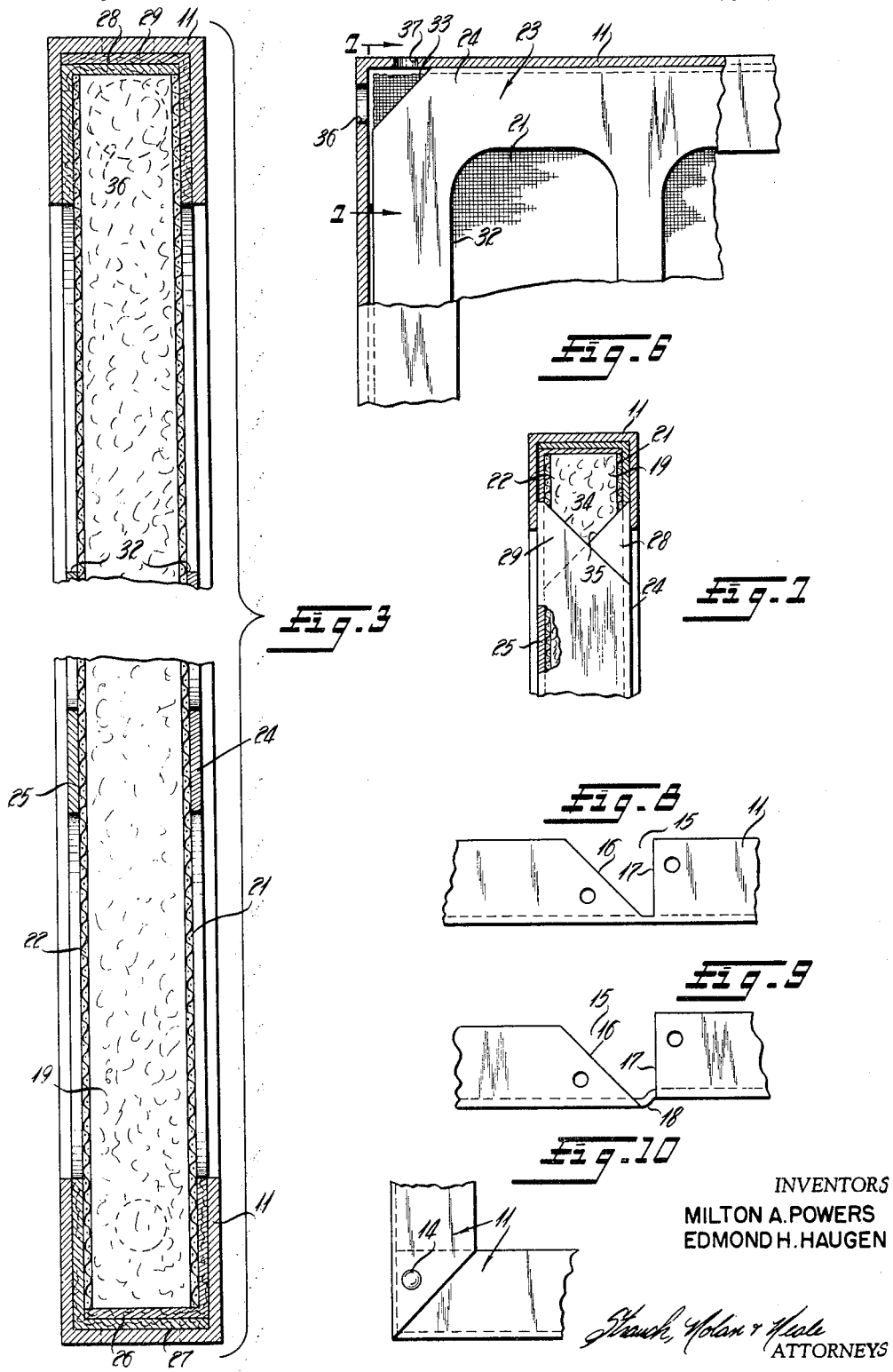

United States Patent Office 3,237,387
Patented Mar. 1, 1966

3,237,387
FILTER ASSEMBLY
Edmond H. Haugen, Ann Arbor, and Milton A. Powers, Grosse Pointe, Mich., assignors to Skuttle Manufacturing Co., Milford, Mich., a corporation of Michigan
Filed Apr. 20, 1960, Ser. No. 23,470
6 Claims. (Cl. 55—519)

This invention relates to filter assemblies for air and like gases and particularly to such filter assemblies which consist of dry lightweight water resistant components that are readily cleaned and renewed for instant reuse merely by washing.

It is the major object of the invention to provide a novel filter assembly wherein a mat of water resistant fibers is disposed between sheets of plastic filter cloth and bound in an apertured frame of paperboard, the whole in turn enclosed in a circumferential metallic frame.

It is a major object of the invention to provide a novel filter assembly of laminated dry filtering elements having divergent electrostatic properties, supported in a nonmetallic apertured container, the whole being enclosed at the edges only in a circumferential metal frame.

A further object of the invention is to provide a novel filter assembly wherein a stack of dry filtering material is bound in a metal frame with provision for washing by immersion and ready draining.

It is an object of the invention to provide a novel filter assembly wherein layers of dry water resistant fiber and plastic cloth having electrostatic properties are supported in a non-metallic box-like frame.

Another object of the invention is to provide a dry filter assembly for removal of dust particles from air wherein a special apertured corner structure is provided for speeding draining after washing.

Further objects of the invention will appear in connection with the appended claims and the annexed drawings wherein:

FIGURE 3 is an enlarged section substantially on line 3—3 of FIGURE 1 showing the different filter components;

FIGURE 6 is an enlarged front view of a filter assembly corner broken away and sectioned to show the drainage arrangement;

FIGURE 7 is a fragmentary partly sectioned end view of the corner of FIGURE 6; and FIGURES 8–10 show fragmentary details of the channel binding of the filter assembly.

Figure 1:
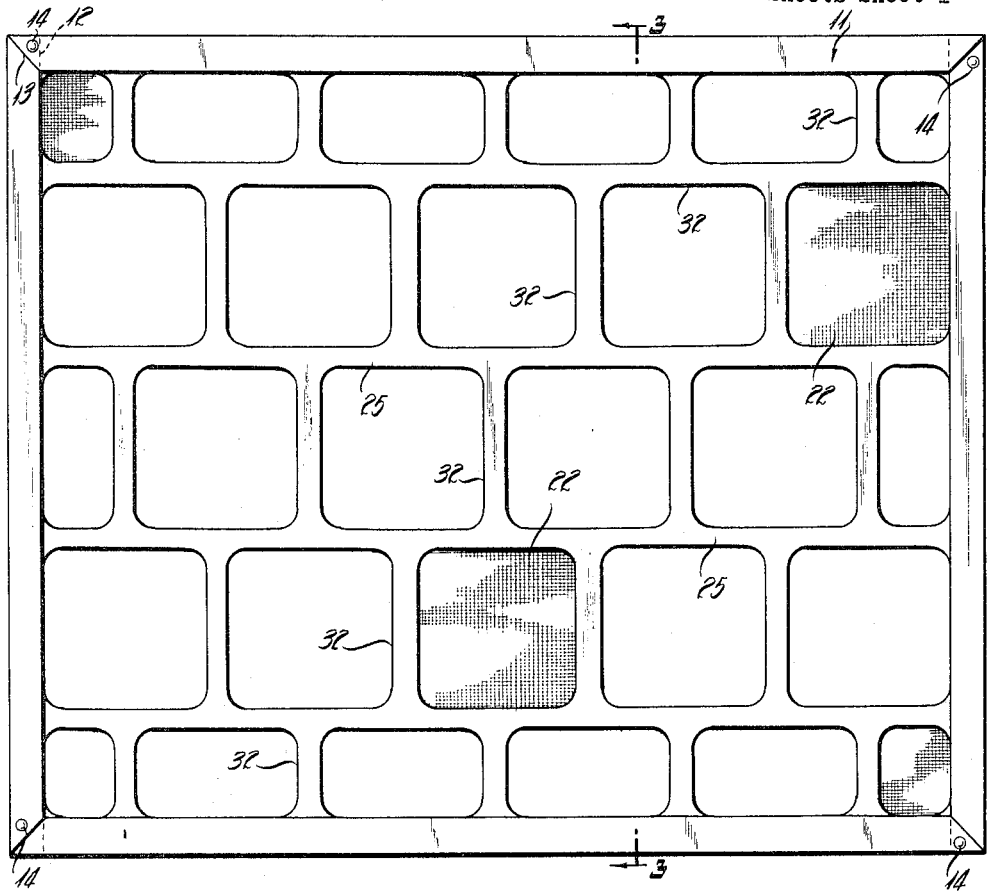
FIGURE 1 is a front elevation of an air or like gas filter assembly according to a preferred embodiment of the invention.

In its preferred embodiment the filter assembly of the invention comprises a narrow rectangular border frame 11 that is a uniform depth U-shaped channel of thin sheet aluminum, galvanized steel, or like lightweight rust resistant bendable metal, a single length of which extends around the entire periphery of the assembly with the channel opening inward. As illustrated one square cut end of the channel is disposed at 12 in a corner and the other end 13 angle cut to interfit also enters the corner, and the ends are secured together as by a rivet or like fastener indicated at 14.

At the other corners, see FIGURES 8–10, the channel 11 is notched at 15, one side 16 of the notch being inclined and the other side 17 being normal to the base of the channel, and the base is offset at 18 (FIGURE 9) to provide for bending of the channel to the form of FIGURE 10. Suitable added fastening elements 14 may be used in holes in the channel sides and rigidly secure each corner if desired.

Interiorly the filter assembly comprises a continuous body 19 of matted glass or like fibers, contacted on both sides by flexible filter sheets 21 and 22 of a woven plastic cloth or the like.

Body 19 is a uniformly thick rectangular mat of glass fibers loosely bonded together by a distributed resin. In a preferred form this is about one inch thick. As is known glass fibers have inherent electrostatic properties, as does the bonded glass mat.

The cloths 21 and 22 are identical rectangular single thickness sheets woven with a suitably open standard weave such as the known honeycomb or waffle weaves used in textiles generally. In commercial embodiments these cloths are woven from filaments or fibers of a synthetic polymer plastic material such as polyvinylidene, polyethylene, polypropylene, polystyrene and the like. Of particular value are woven sheets of linear polyethylene. As alternates to the woven fiber cloth just described, we may use a non-woven cloth, sheet material having apertures, or expanded apertured sheet material made from plastic or other base material having desired electrostatic properties. All of these synthetic polymer materials are water resistant and have inherent electrostatic properties which are selected to be different from those of the fiber mat 19. For more detailed explanation of the electrostatic actions of various materials suitable for incorporation in electrostatic filters of the type here discussed, please refer to copending application Serial No. 63,018, filed October 17, 1960, by Edmond H. Haugen.

In the invention the relative electrostatic properties of the woven sheets 21, 22 and the fiber mat 19 are correlated so that in normal operation air-borne dust and like particles which bear an inherent electric charge, or may be charged in transit, are attracted and held by the charged plastic sheets 21 or by the oppositely charged fiber mat 19.

Figure 2:
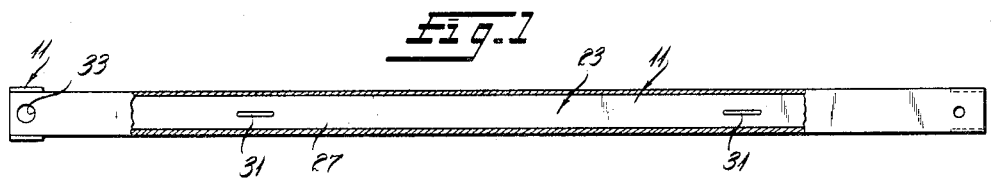
FIGURE 2 is an end elevation of the filter assembly of FIGURE 1 partly broken away and sectioned to show the interior.
Figure 4:
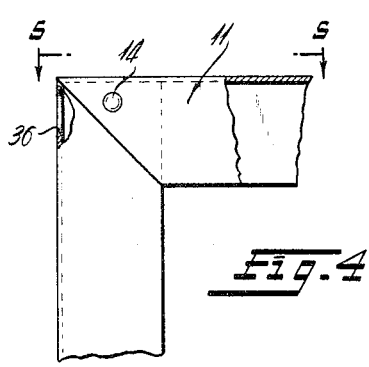
FIGURES 4 and 5 are fragmentary front and end views of a corner of the assembly of FIGURE 1, partially broken away and sectioned.
Figure 5:
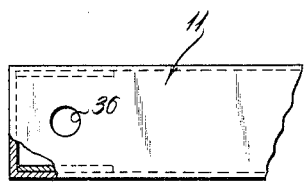

The sandwich of glass fiber mat 19 and flexible filter sheets 21, 22 is enclosed in a lightweight frame 23 of moisture-proofed cardboard, paperboard or the like consisting essentially of two rectangular apertured sheets 24 and 25 of laminated paperboard having edge flanges turned toward each other and interlocked. As shown in FIGURE 3 sheet 24 has one side edge flange 26 bent at right angles to lie inside and flush with side edge flange 27 of sheet 24, and the interfit at the opposite side is the same but with the flanges reversed, flange 28 of sheet 24 here being inside flange 29 of sheet 25. The same structure is present at the other two sides of the filter, and along each side one or more staples or like fasteners 31 (FIGURE 2) secure the flanges together, so that the paperboard sheets provide a box-like stiff frame 23 which is substantially closed along most of the side edges and is apertured front and rear to permit air passage. This construction insures stiffness for the entire subassembly before enclosure within the metal outer frame and after final assembly prevents edge collapse under compression as the metal frame by itself does not protect against collapse from forces acting inside the periphery of the metal frame itself.

The apertures 32 in sheets 24 and 25, which sheets are parallel in the assembly, are preferably staggered in each sheet but preferably the apertures of each sheet are aligned in the assembly to provide a minimum of air blockage and maximum filter area. Only sufficient areas of sheets 24 and 25 are retained between aperatures 32 to stiffen and support the filtering materials enclosed in frame 23 against sagging from or being forced out of alignment with the frame. The corners of the apertures are rounded to reduce tearing.

Each sheet 24 and 25 is preferably a laminate of stiff waterproof board or paper or like fibrous material. The laminated sheets may be further coated with a layer of wax which does not melt at temperatures up to about 220° F. and which protects the paperboard during washing. Alternately a plain or colored plastic coating may be used.

In the process of manufacturing the filter assembly one apertured laminated paperboard sheet 24 or 25 with the edge flanges upturned is laid on a flat surface, the fabric sheet 21 is laid therein, the glass mat 19 is laid in, the fabric sheet 22 laid over the mat, and then the other paperboard sheet 25 is placed over sheet 22, the edge flanges of sheets 24 and 25 slidably snugly interfitting to form the box-like frame 23 which may if desired for ease in assembly be then secured by staples 31. This subassembly is then ready to be bound in the channel 11.

Referring to FIGURES 6 and 7, all of the corners of frame 23 are preferably cut off as indicated at 33, usually by cutting off the sheet corner and sections of the edge flanges as shown in FIGURE 7 at 34 and 35. These openings 33 constitute opposite corner openings in the frame 23, and they lie opposite the apertures 36 and 37 formed in the channel base at each corner of the border frame 11. The purpose of these openings 33, 36 and 37 is to provide for speedy complete draining of the entire assembly simply by poising the assembly on one corner after washing.

The invention provides a novel lightweight inexpensive air filter of high dust filtering efficiency. It consists of materials that are essentially inert with respect to water, so that there is no rusting or other similar deterioration. This is a completely dry filter in operation since it electrostatically attracts and holds the particles removed from the air, and no oil or other sticking impregnating medium is employed. The filter may be quickly washed with water or a suitable washing solution and speedily completely drained. The inert materials of the channel, mat and filter elements and the paperboard frame are susceptible of quick thorough washing, and once washed the filter is fully renewed and ready for use. No oiling is necessary. The filter is symmetrical and reversible as to air flow so that no atension is required as to which side of the filter is inserted into the holder. It quickly dries completely after return to the air stream in the furnace.

It will be noted from FIGURE 3 that the metal border 11 projects across the front and rear sides of the filter assembly only to the extent of the outer periphery of cardboard frame 23. Within the border 11 the side flanges of the cardboard sheets of frame 23 fit snugly together and with the border so that the edges of the filter frame are rigidly supported and protected and there is no tendency to pull out of the border.

The box-like frame 23 is sufficiently stiff to maintain its shape and keep the filtering components in position, and the continuous U-shaped metal border 11 gives rigidity to the whole assembly and supports the frame 23 all around its periphery and laterally adjacent the periphery so that the overall assembly is sturdy. The electrically insulating nature of box-like frame 23 insures that the charged contents thereof, the oppositely electrostatically charged plastic cloth and glass fiber mat, are effectively insulated from the surrounding metal frame, so that the charges are not grounded to the metal frame and do not leak away.

During draining the U-shape of the border 11 acts like a trough to convey water to the drain holes at the lowest corners.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A dry waterproof washable filter assembly for removing dust from moving air and other gases comprising a mat of glass fibers sandwiched between apertured sheets of waterproof synthetic polymer plastic material, a laterally apertured box-like frame composed of relatively stiff water resistant non-metallic material enclosing said sandwich, and a rigid substantially U-shaped metal border assembly mounted on said frame and encompassing said frame all around its periphery.

2. The filter assembly defined in claim 1, wherein said sheets of polymer material are flexible cloth woven from threads of said material.

3. The filter assembly defined in claim 1, said box-like frame comprising apertured parallel front and rear sheets of said material having edge flanges turned toward each other and secured together within said substantially U-shaped metal border.

4. The filter assembly defined in claim 1, said border assembly comprising a single length of bendable U-shaped metal channel extending around and closely embracing said frame at its periphery.

5. A dry waterproof washable filter assembly for removing dust from moving air and other gases comprising a mat of glass fibers capable of carrying an electrostatic charge sandwiched between flexible perforated sheets of waterproof synthetic polymer plastic material capable of carrying a different electrostatic charge, a laterally apertured box-like frame composed of relatively stiff electrically insulating water resistant fibrous material enclosing said sandwich, and a rigid substantially U-shaped metal border mounted on said frame and closely encompassing said frame all around its periphery.

6. A dry waterproof washable filter assembly for removing dust from moving air and other gases comprising a mat of glass fibers capable of carrying an electrostatic charge, sheets of flexible polyethylene cloth on opposite sides of said mat, said sheets being capable of carrying an electrostatic charge different from that of said mat, a box-like frame of stiff electrically insulating fiberboard enclosing the mat and sheets with the sides of said frame apertured to expose said filter sheets for passing air therethrough, and a substantially U-shaped rigid metal binding mounted upon said frame and extending closely around the periphery of said frame.

References Cited by the Examiner

UNITED STATES PATENTS 2,108,283  2/1938  Drew et al. _____ 55—485
2,160,003  5/1939  Slayter et al. _____ 55—509

(Other references on following page)

UNITED STATES PATENTS

| | | | |
|---|---|---|---|
| 2,297,601 | 9/1942 | Williams | 55—132 |
| 2,521,984 | 9/1950 | Lang | 55—514 |
| 2,557,279 | 6/1951 | Greenberg | 55—515 |
| 2,597,927 | 5/1952 | Endres | 55—103 |
| 2,715,453 | 8/1955 | Lange | 55—359 |
| 2,723,731 | 11/1955 | Schaaf | 55—329 |
| 2,784,132 | 3/1957 | Maisel | 55—522 XR |
| 2,789,663 | 4/1957 | Camp | 55—513 |
| 2,877,863 | 3/1959 | Lurie | 55—514 |

FOREIGN PATENTS 747,144   3/1956   Great Britain.

OTHER REFERENCES

"How Dust Filter Selection Depends on Electrostatics," Chem. Engr. 68, No. 13, pp. 107–114, 1961.

JULIUS GREENWALD, *Primary Examiner.*

WESLEY S. COLE, WALTER BERLOWITZ, ALBERT T. MEYERS, *Examiners.*